US012679302B2

(12) United States Patent
Williamson et al.

(10) Patent No.: US 12,679,302 B2
(45) Date of Patent: Jul. 14, 2026

(54) AIRBAG, PREFERABLY OPW AIRBAG, FOR A VEHICLE

(71) Applicant: Global Safety Textiles GmbH, Bad Säckingen (DE)

(72) Inventors: David Williamson, Lörrach (DE); Daniel Albiez, Murg (DE)

(73) Assignee: GLOBAL SAFETY TEXTILES GMBH, Bad Säckingen (DE)

( * ) Notice: Subject to any disclaimer, the term of this patent is extended or adjusted under 35 U.S.C. 154(b) by 0 days.

(21) Appl. No.: 18/948,719

(22) Filed: Nov. 15, 2024

(65) Prior Publication Data

US 2025/0170983 A1      May 29, 2025

(30) Foreign Application Priority Data

Nov. 24, 2023    (DE) ..................... 10 2023 132 910.3

(51) Int. Cl.
*B60R 21/235*        (2006.01)
*B60R 21/203*        (2006.01)
(Continued)

(52) U.S. Cl.
CPC .......... *B60R 21/235* (2013.01); *B60R 21/203* (2013.01); *B60R 21/231* (2013.01); *B60R 21/233* (2013.01); *B60R 2021/23509* (2013.01); *B60R 2021/23538* (2013.01); *B60R 2021/23547* (2013.01)

(58) Field of Classification Search
CPC ... B60R 21/203; B60R 21/231; B60R 21/233; B60R 21/235; B60R 2021/23308; B60R 2021/23316; B60R 2021/23509; B60R 2021/23538; B60R 2021/23547
See application file for complete search history.

(56) References Cited

U.S. PATENT DOCUMENTS 3,752,501 A * 8/1973 Daniel .................. B60R 21/233
280/771
3,792,873 A * 2/1974 Buchner ................ B60R 21/23
139/389

(Continued)

FOREIGN PATENT DOCUMENTS

DE      102020206551 A1 * 12/2001    ....... B60R 21/23138
DE      202018101242 U1     6/2019
(Continued)

*Primary Examiner* — Laura Freedman
(74) *Attorney, Agent, or Firm* — Chrisman Gallo Tochtrop LLC

(57) ABSTRACT

The invention relates to an airbag, preferably an OPW airbag, which is configured to be set from an uninflated state to an inflated state by an inflation operation to protect an occupant of a vehicle. According to the invention, it is provided that the airbag has at least two fabric layers which are connected to one another in such a way that a plurality of airbag chambers are formed, wherein in the inflated state the airbag chambers are each formed as tubular chambers, which extend and/or are arranged transversely and/or obliquely and/or parallel to a depth direction of the airbag in the inflated state in such a way that the outer shape of the airbag assumes the shape of a tube, in particular a tube with an oval or elliptical cross-section or a hollow cylinder with a circular cross-section.

8 Claims, 8 Drawing Sheets

(51) Int. Cl.
  B60R 21/231     (2011.01)
  B60R 21/233     (2006.01)

(56)           References Cited

U.S. PATENT DOCUMENTS

| | | | | | |
|---|---|---|---|---|---|
| 3,907,327 | A | * | 9/1975 | Pech | B60R 21/23 |
| | | | | | 280/743.2 |
| 3,991,249 | A | * | 11/1976 | Yamashita | D03D 11/02 |
| | | | | | 139/389 |
| 5,249,824 | A | * | 10/1993 | Swann | B60R 21/233 |
| | | | | | 280/739 |
| 5,505,485 | A | * | 4/1996 | Breed | B32B 3/266 |
| | | | | | 280/739 |
| 6,419,263 | B1 | * | 7/2002 | Busgen | D03D 1/02 |
| | | | | | 139/389 |
| 6,742,805 | B2 | * | 6/2004 | Hill | B60R 21/235 |
| | | | | | 280/730.2 |
| 7,360,790 | B2 | * | 4/2008 | Hasebe | B60R 21/2338 |
| | | | | | 280/743.2 |
| 7,832,759 | B2 | * | 11/2010 | Henricsson | B60R 21/23138 |
| | | | | | 280/730.2 |
| 7,922,190 | B2 | * | 4/2011 | Sugimoto | B60R 21/233 |
| | | | | | 280/736 |
| 8,087,690 | B2 | * | 1/2012 | Kim | B60R 21/214 |
| | | | | | 280/729 |
| 8,864,168 | B2 | * | 10/2014 | Ichida | B60R 21/18 |
| | | | | | 280/743.1 |
| 9,296,359 | B2 | * | 3/2016 | Pan | B60R 21/23 |
| 10,029,643 | B2 | * | 7/2018 | Spahn | B60R 21/239 |
| 10,322,691 | B2 | * | 6/2019 | Ohmi | B60R 21/231 |
| 10,336,280 | B2 | * | 7/2019 | Faruque | B60R 21/233 |
| 10,710,542 | B2 | * | 7/2020 | Aranzulla | B60R 21/231 |
| 11,465,579 | B1 | * | 10/2022 | Faruque | B60R 21/013 |
| 11,529,926 | B2 | * | 12/2022 | Sapountzis | B60R 21/2338 |
| 11,618,982 | B2 | * | 4/2023 | Albiez | D03D 11/00 |
| | | | | | 139/389 |
| 11,673,525 | B2 | * | 6/2023 | Moran | B60R 21/232 |
| | | | | | 280/730.2 |
| 11,766,987 | B2 | * | 9/2023 | Albiez | B60R 21/2338 |
| | | | | | 280/729 |
| 12,311,866 | B1 | * | 5/2025 | Zhang | B60R 21/205 |
| 2004/0256842 | A1 | * | 12/2004 | Breed | B60R 21/239 |
| | | | | | 280/730.1 |
| 2013/0088056 | A1 | * | 4/2013 | Quatanens | B60R 21/231 |
| | | | | | 297/216.13 |
| 2014/0030455 | A1 | * | 1/2014 | Ruschulte | B25J 9/1075 |
| | | | | | 139/11 |
| 2016/0001735 | A1 | * | 1/2016 | Quatanens | B64D 11/06205 |
| | | | | | 280/743.1 |
| 2023/0192024 | A1 | * | 6/2023 | Oh | B60R 21/237 |
| | | | | | 280/730.2 |
| 2025/0170982 | A1 | * | 5/2025 | Williamson | B60R 21/235 |
| 2025/0178557 | A1 | * | 6/2025 | Williamson | B60R 21/233 |

FOREIGN PATENT DOCUMENTS

| | | | | |
|---|---|---|---|---|
| DE | 102019124091 A1 | 7/2020 | | |
| DE | 102021129766 A1 | 5/2023 | | |
| GB | 2339557 A * | 2/2000 | | D04B 21/10 |
| JP | H04-176749 A | 6/1992 | | |
| JP | 2017-222331 A | 12/2017 | | |
| JP | 2021-167188 A | 10/2021 | | |
| WO | 2020156953 A1 | 8/2020 | | |

* cited by examiner a)

b)

c)

24

10

14 d)

NA        UWN        NA        10

K

S

LKB

ETB

ZTB $22_1$        18        10        $22_2$

10

14

10

14

$22_2$ $22_1$

10

18

10

18

10

14

20

10

14

AIRBAG, PREFERABLY OPW AIRBAG, FOR A VEHICLE

CROSS-REFERENCE TO RELATED APPLICATIONS

This application claims the benefit of priority to German Application No. 10 2023 132 910.3, filed Nov. 24, 2023, the entire disclosures of which are hereby incorporated herein by reference.

FIELD OF THE INVENTION

The invention relates to an airbag, preferably an OPW airbag, which is configured to be set from an uninflated state, for example a folded or collapsed state, to an inflated state, for example an unfolded state, in which the airbag can achieve its protective effect for the occupant, in order to protect an occupant of a vehicle such as a motor vehicle or commercial vehicle by means of an inflation operation.

BACKGROUND OF THE INVENTION

Airbags used in vehicles can be manufactured in different ways and are referred to as OPW airbags, Cut & Sew airbags or Cut, Seal & Sew airbags, for example, depending on the method of manufacture.

OPW airbags, so-called one-piece woven airbags, are airbags or airbags woven from one piece, while Cut & Sew airbags or Cut, Seal & Sew airbags are obtained by cutting several pieces of fabric, which may be glued and then sewn together.

Such airbags are widely used as part of vehicle restraint systems to protect vehicle occupants from collision with components of a vehicle structure such as a steering wheel, dashboard, door frame, etc.

Restraint systems in the form of airbag systems with such OPW airbags or airbags or with conventional airbags manufactured using the Cut & Sew or Cut, Seal & Sew process are actively activated if necessary and are widely known as active restraint systems in vehicles such as motor vehicles.

Various types of airbags are known from the state of the art, for example in the form of driver and front passenger airbags, side airbags, far-side airbags, head airbags, knee airbags, window airbags, etc. The so-called far-side airbags, also known as front-center airbags, are located in the driver's seat of motor vehicles on the side facing the front passenger, for example.

Driver or front passenger airbags, which are used for frontal impact protection, are usually installed on the vehicle's steering wheel in front of the driver or behind the instrument panel for the other occupants (front passenger) in the front seats. In addition to frontal impact protection, airbags are also used to protect against side impacts. For example, the aforementioned side airbags, such as curtain airbags, side airbags in the seat or in the door trim, etc., are also provided. In particular, curtain airbags or special side airbags are thus generally fitted along roof side rails, i.e. the roof structure of the vehicle body, and deploy there to form an energy-absorbing structure between the head and upper torso of an occupant and the interior components of the vehicle.

In the event of an accident or imminent accident, a sensor fitted to the vehicle measures an abnormal deceleration of the vehicle. For example, gas is supplied to the airbag within a few milliseconds to set it from an uninflated state to an inflated state during an inflation operation. This is accomplished by a device such as a gas generator, commonly referred to as an "inflator". The inflated airbag cushions the vehicle occupant from the impact forces.

In addition to the aforementioned OPW method, airbags are also often manufactured in a somewhat more complex way using the aforementioned Cut & Sew method or Cut, Seal & Sew method.

In particular, the Cut & Sew method only involves cutting pieces of fabric forming fabric layers to the desired shape, placing them on top of each other and sewing them together to form the airbag, the so-called Cut & Sew airbag.

Known airbags manufactured using the Cut, Seal & Sew method for this purpose are complex solutions and are produced with a high degree of manufacturing effort, for example by cutting out two or more identical or partially identical or different production parts from a flat fabric coated with silicone, spraying a sealing compound onto the edges—e.g. in the form of a circumferential bead—and then placing the two or more fabric parts on top of each other and then bonding the parts together. In addition, the fabric layers formed in this way are provided with a seam to ensure sufficient strength of the adhesive seam.

In the case of airbags manufactured using the Cut & Sew method and airbags manufactured using the Cut, Seal & Sew method, additional components, e.g. catch straps, flaps etc., sometimes also have to be sewn on in a further process step for shaping (with or without sealant).

The Cut & Sew method and the Cut, Seal & Sew method can therefore be more time-consuming and cost-intensive than the OPW method and often require numerous manual method steps.

In order to increase the protective effect of airbags or airbags, an approach is taken, for example, when designing airbags, especially in the region of frontal protection (such as driver airbags, passenger airbags), to design the airbags with a greater airbag depth and with a larger contact surface or impact surface into which an occupant is impacted in the event of a collision. Up to now, it is known from the state of the art that the airbags are balloon-shaped, but this requires a higher airbag volume. However, larger airbag volumes require larger gas generators and therefore inevitably more installation space in the vehicle, which is contrary to the design specifications for the airbag design.

BRIEF SUMMARY OF THE INVENTION

It is therefore an object of the invention to further develop the airbags of the same type in such a way that an airbag depth equal to or greater than that of the prior art can be achieved with a lower filling volume, in particular without requiring an increased installation space and/or an increased inflation time.

This object is achieved with the features of the independent claim.

Advantageous embodiments and further embodiments of the invention are shown in the dependent claims.

The airbag according to the invention is preferably an OPW airbag and is configured to be set from an uninflated state, for example a folded or collapsed state, to an inflated state in which the airbag provides sufficient impact protection or can achieve its protective effect for the occupant, in order to protect an occupant of a vehicle by means of an inflation operation. The airbag has at least two fabric layers, preferably two fabric layers in some regions and/or three fabric layers in some regions, which are connected to one another in such a way that a plurality of airbag chambers in fluid communication with one another are formed, wherein the airbag chambers are each formed as tubular chambers in the inflated state, which extend and/or are arranged transversely and/or obliquely and/or parallel to a depth direction of the air bag in the inflated state in such a way that the outer shape of the air bag assumes the shape of a tube, in particular a tube with an oval or elliptical cross-section or a hollow cylinder with a circular or ring-shaped cross-section.

Preferably, the depth direction of the airbag in the inflated state corresponds to an axial direction of the tube or hollow cylinder.

For example, the tubular chambers or airbag chambers thus extend transversely, i.e. at right angles, to the depth direction or axial direction of the tube in its circumferential direction and can thus take the form of a circular ring or circular ring segment.

If the tubular chambers are parallel to the depth direction or axial direction of the tube, they run, for example, in the form of elongated tubes in the longitudinal direction of the tube and are preferably distributed or offset around the tube in the circumferential direction.

Another embodiment of the tubular chambers is when they run at an angle to the depth direction, i.e. their direction of extension runs both in the axial direction and in the circumferential direction. For example, a tubular chamber designed in this way takes the form of a helix, i.e. a helical line or cylindrical spiral that describes a curve that winds with a constant pitch around the shell of a cylinder, i.e. in this case the hollow cylinder, by a certain angle.

Also conceivable are embodiments of the airbag in which the multiple tubular chambers are arranged one behind the other in the direction in which they extend, for example chambers arranged one behind the other parallel to the depth direction or chambers arranged one behind the other transverse to the depth direction and in the circumferential direction. The chambers, which are arranged one behind the other, are spatially separated from each other by respective seam portions, but are in fluid connection with each other.

In connection with the tubular chambers, tubular means, among other things, that they form an elongated hollow body with any desired cross-section, in particular with a circular, oval, semi-circular or rectangular cross-section.

The large protective surfaces or impact areas and deeper inflation heights can be achieved without noticeably increasing the airbag or airbag volume by the embodiment of the airbag according to the invention, namely forming it in the manner of an inflatable, ring-shaped tubular construction with a plurality of parallel and/or transverse and/or oblique running tubular chambers, i.e. larger protective volumes can be realized with the same or even lower inflation volume of the airbag.

In addition, the protective surface or impact area can be designed or extended as required by arranging several inflated tubes or the multitude of tubular chambers next to and/or on top of each other. Very rigid and stable shapes/geometries of the airbag can be produced by the targeted arrangement of e.g. longitudinal, oblique, transverse or randomly running tubes or tubular chambers, with large and/or small diameters, which support each other in the inflated state. It is particularly advantageous in terms of the rigidity and stability of the airbag if it is manufactured as an OPW airbag and has at least three layers in certain regions. Preferably, the three-layer region is formed with a chamber structure or tubular structure of the plurality of airbag chambers, which causes a curvature of the airbag to achieve the tubular shape or hollow cylindrical shape of the airbag while ensuring a high rigidity and stability of the airbag.

The airbag according to the invention can be designed for known airbag applications, for example driver airbags or side airbags, or other types of airbag applications for autonomously driving vehicles.

If the airbag according to the invention is designed as an OPW airbag, manufacturing costs can be further reduced, since Cut & Sew airbags require a larger number of sewing steps and several quality controls compared to the production of an OPW airbag.

Preferably, the airbag is manufactured as a 3-layer OPW airbag, which is designed in such a way that it assumes a tubular or hollow cylindrical shape in the inflated state, which is held in shape, for example, by an attached longitudinal and/or fixing seam (sewn, not woven), i.e. a fixing seam running in the longitudinal or vertical direction of the airbag. If, for example, fabric layers lying on top of each other in the laid out and uninflated state form a rectangle which corresponds to the unrolled casing of the hollow cylindrical airbag, lateral end sections or edge sections of the rectangle can be connected to each other, preferably by the sewn fixing seam. Preferably, the superimposed fabric layers are woven together in their edge portions to form a circumferential woven seam, wherein two opposite edge portions of the rectangle thus formed are joined together, preferably sewn together by the fixing seam. Accordingly, i.e. on the basis of the chamber structure and the fixing seam, the airbag designed in this way can assume the hollow cylinder shape in the inflated state.

Likewise, the airbag according to the invention is preferably configured in such a way that an OPW structure or an OPW chamber structure serves in particular to hold an attached flat fabric, namely to keep it under tension and bring it into position so that it forms the protective surface or impact surface. For example, the flat fabric can be arranged and attached to one end of the tubular or hollow cylindrical airbag in the inflated state. The impact into the airbag is thus preferably not into an airbag chamber or chamber filled with excess pressure, but merely onto a (fabric) piece or flat fabric piece held under tension by the plurality of airbag chambers. In addition, the airbag design according to the invention can be used to further reduce the packing volume, for example of driver airbags.

Furthermore, the airbag according to the invention can be further configured such that the plurality of airbag chambers formed as tubular chambers are arranged offset in the circumferential direction of the airbag in the inflated state, so that the arrangement of the plurality of airbag chambers forms a tubular cover or a hollow cylinder wall and/or the outer shape of the airbag assumes the shape of a tube or a hollow cylinder. Accordingly, the chamber structure of the airbag with the plurality of tubular chambers forms a tubular cover or a hollow cylinder wall, which forms a fillable volume of the airbag and surrounds a space (cavity) outside the fillable volume of the airbag, i.e. a space in which a pressure or atmospheric pressure different from the internal pressure of the airbag prevails.

In addition, the airbag according to the invention can be realized in such a way that the plurality of airbag chambers formed as tubular chambers extend in the inflated state in the axial direction of the airbag formed in the shape of the tube or hollow cylinder and are radially offset from one another in such a way that a group/plurality of inner airbag chambers arranged next to one another in the circumferential direction and a group/plurality of outer airbag chambers arranged next to one another in the circumferential direction, i.e. airbag chambers arranged radially further outwards, are formed. i.e. airbag chambers arranged radially further outwards, are formed. Thus, the tubular cover or hollow cylinder wall is formed by the respective axially running inner and outer airbag chambers, whereby a certain rigidity and stability of the airbag in the inflated state can be achieved, as the airbag chambers are at least partially supported against each other.

Moreover, the airbag according to the invention can be designed such that the tubular inner airbag chambers and the tubular outer airbag chambers have different diameters. Preferably, the tubular inner airbag chambers have larger diameters than the tubular outer airbag chambers and, in particular, have the same or different filling volumes. Such a chamber structure consisting of the outer and inner airbag chambers thus makes it possible to achieve a curvature of the airbag that can meet the requirements for rigidity and stability of the airbag in the inflated state.

Furthermore, the airbag according to the invention can be implemented in such a way that the at least two, preferably three, fabric layers for forming the airbag in the form of the tube or hollow cylinder are joined together in such a way that, in the inflated state of the airbag, the fabric layers form a tubular cover or a hollow cylinder wall, in the axial direction of which the airbag chambers extend, and two side end portions of the fabric layers running in the axial direction are joined together, preferably sewn, glued or welded. Provided that the side end portions of the fabric layers are not connected and the airbag is laid out or spread out, the airbag has a substantially rectangular shape, in which the width (end) portions of the rectangular shape form said side end portions to be connected.

In this context, the airbag according to the invention can be realized in such a way that the at least two, preferably three, fabric layers in the side end portions are joined or interwoven to form a single layer, so that the side end portions form single-layer seam portions which are joined, preferably sewn, to one another. Alternatively, however, it is also conceivable that the side end portions are formed in three layers, optionally forming airbag chambers, and are nevertheless joined together, preferably sewn.

Furthermore, the airbag according to the invention can be further formed in such a way that the airbag has, at least in portions or in certain regions, three fabric layers, namely a first fabric layer, a second fabric layer and a third fabric layer. Thereby, the second fabric layer is arranged between the first fabric layer and the third fabric layer. Preferably, viewed from the outside of the inflated hollow cylindrical or tubular airbag, the first fabric layer forms an outer fabric layer, the second fabric layer forms a middle fabric layer and the third fabric layer forms an inner fabric layer of the airbag. The outer fabric layer and the inner fabric layer thus form an outer shell and inner shell of the airbag. The three fabric layers are interwoven in such a way that outer airbag chambers extending in the axial direction and arranged offset in the circumferential direction are formed between the first/outer fabric layer and the second/middle fabric layer and inner airbag chambers extending in the axial direction and arranged offset in the circumferential direction are formed between the second/middle fabric layer and the third/inner fabric layer, wherein the outer and inner airbag chambers, during their respective inflation operations, effect a curvature radially outwards in portions (relative to the hollow cylindrical or tubular airbag) to form the tube or the hollow cylinder.

Such a chamber structure can be used to achieve the required rigidity and stability of the airbag in its inflated state. Preferably, at least the portions or regions of the airbag that form the outer and inner airbag chambers are three-layered, while remaining regions of the airbag (such as the region with the generator mouth or a connection region) are preferably two-layered or three-layered.

Furthermore, the airbag according to the invention can be designed such that the airbag is configured as an OPW airbag with warp threads and weft threads which are woven into the woven fabric layers, wherein the warp threads and weft threads are woven together such that the airbag has a first partial region and a second partial region as well as a region forming airbag chambers, wherein the first partial region is arranged between the region forming airbag chambers and the second partial region, wherein the warp threads and weft threads in the second partial region are woven together in such a way that the second partial region has at least one generator mouth for receiving a gas generator for filling the airbag or a connection for connecting a generator and is formed in two layers, wherein the warp threads and weft threads in the airbag chamber-forming region are woven together in such a way that the airbag chamber-forming region has the plurality of airbag chambers and is formed in three layers, and wherein the warp threads and weft threads of the second fabric layer emerge from the second fabric layer in the first partial region and float completely between the first fabric layer and the third fabric layer and are incorporated into the first fabric layer and/or into the third fabric layer in the second partial region. Thus, the first fabric layer and third fabric layer in the second partial region have the warp threads and weft threads of the second fabric layer.

In an alternative embodiment, the warp and weft threads are woven differently from the embodiment described above, particularly in the first and second partial regions.

According to the alternative variant, the weft threads of the middle fabric layer emerge from the middle fabric layer in the first partial region of the airbag and are partially attached to the upper fabric layer and partially attached to the lower fabric layer, whereas the warp threads of the middle fabric layer emerge from the middle fabric layer in the first partial region of the airbag and float freely between the lower fabric layer and the upper fabric layer. In the second partial region, the weft threads and the warp threads of the middle fabric layer are incorporated into the lower fabric layer or into the upper fabric layer or attached to the lower fabric layer or to the upper fabric layer at a few attachment points.

Of course, the warp and weft directions and thus the warp and weft threads can, in principle, be reversed in both designs.

Furthermore, the airbag according to the invention can be designed in such a way that an end face end portion or each of two end face end portions of the airbag designed in the form of the tube or hollow cylinder is connected or closed with a flat clamping element which spans a (respective) end face of the hollow cylinder during the inflation operation of the airbag. The flat clamping element is preferably a circular flat fabric piece that has been cut to size and serves as the impact surface of the airbag. However, other textile fabrics such as non-woven fabric blanks, etc. are also conceivable.

BRIEF DESCRIPTION OF THE DRAWINGS

Preferred embodiments of the invention are explained below by way of example with reference to the figures.

These show.

DETAILED DESCRIPTION OF THE INVENTION

Figure 1:
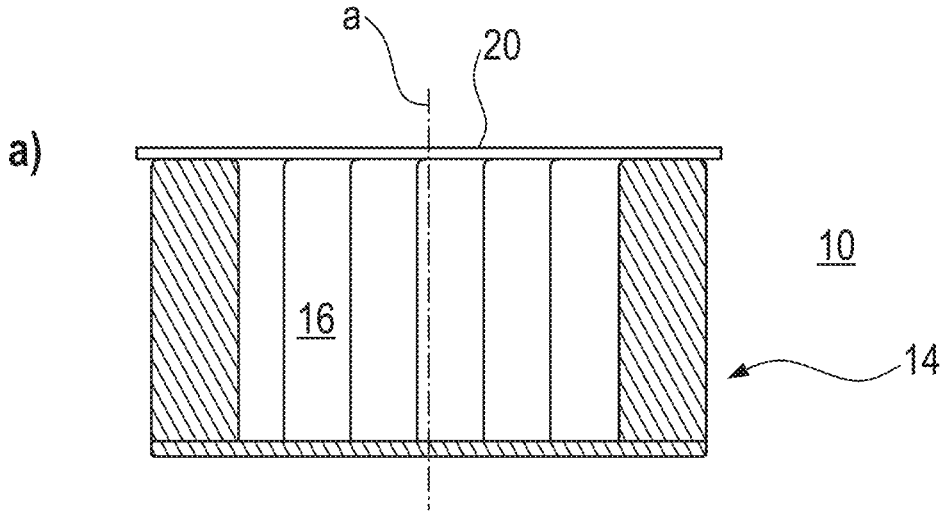
FIG. 1a) a schematic representation of an airbag according to the invention in a lateral cross-sectional view.
FIG. 1b) a schematic representation of the airbag according to the invention of FIG. 1a) in a cross-sectional view from above.
FIG. 1c) a schematic representation of the airbag according to the invention of FIGS. 1a) and 1b) as a steering wheel airbag in a side view.
FIG. 1d) a schematic representation of the airbag of the invention of FIGS. 1a) and 1b) in a deployed state.
FIG. 1e) a schematic cross-sectional representation of the airbag according to the invention of FIG. 1d) in a laid-out state.
FIG. 1f) a schematic representation of the airbag according to the invention of FIG. 1d) in an inflated state in cross-section from above.
Figure 1:
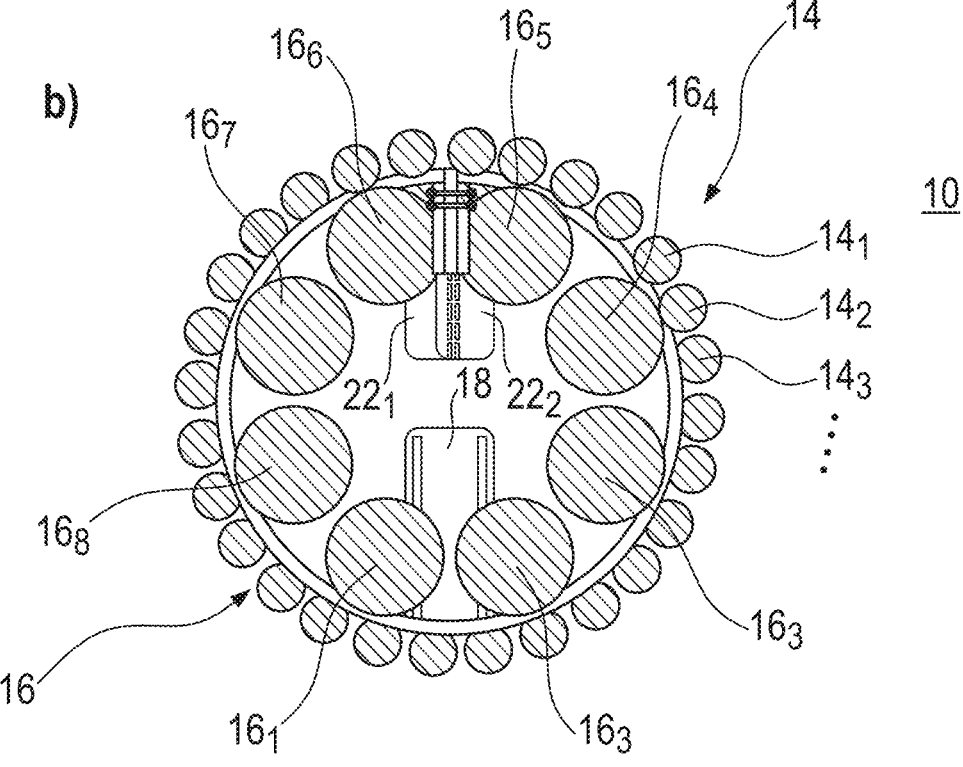
Figure 1:
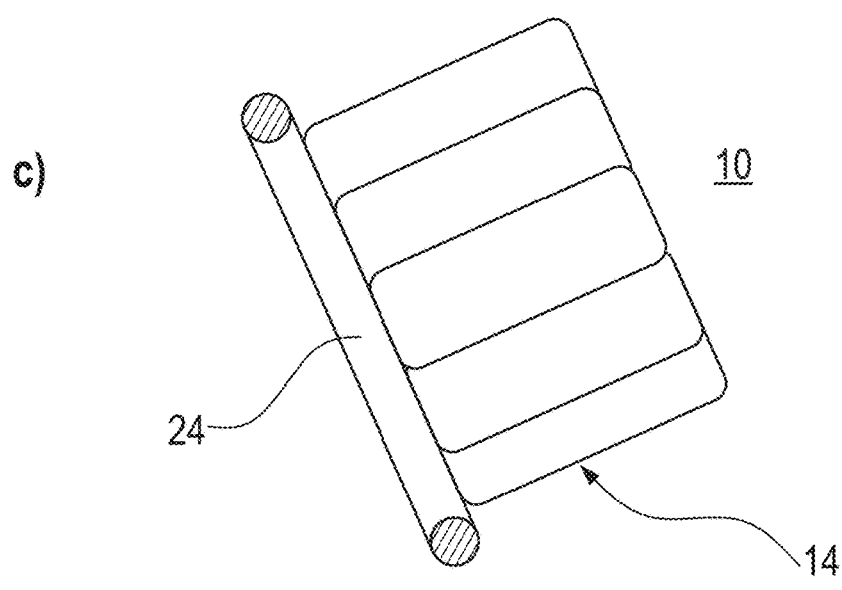
Figure 1:
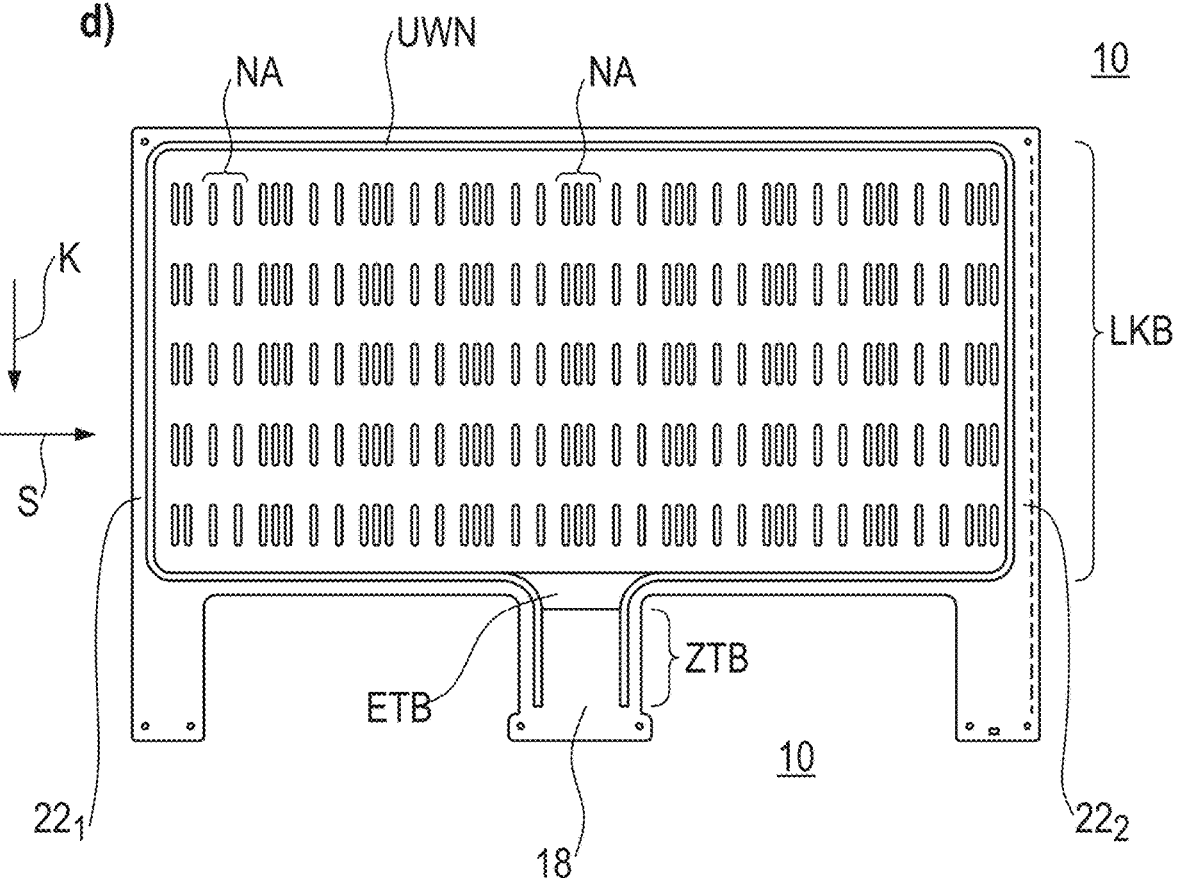
Figure 1:
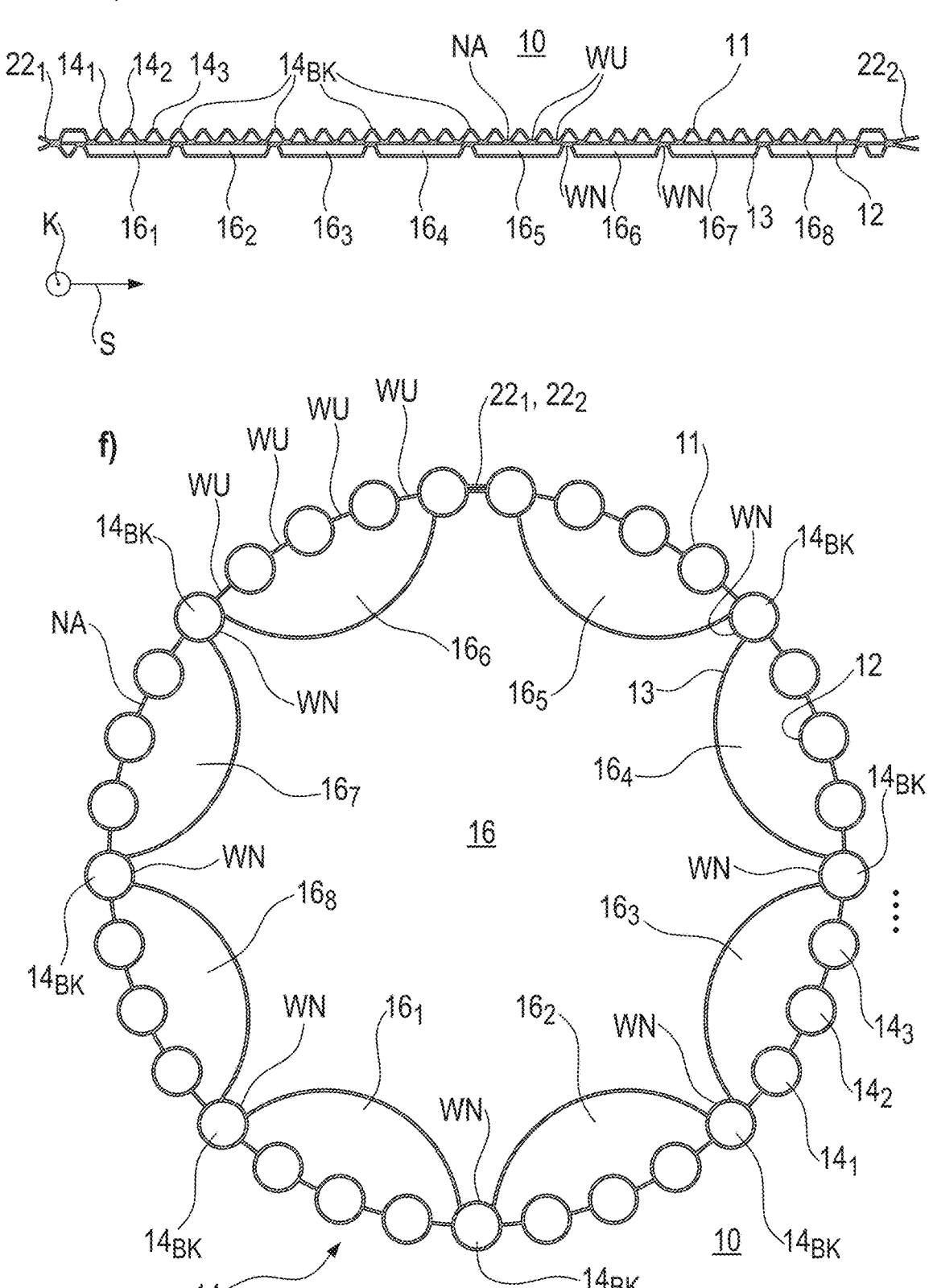

FIGS. 1 to 10 show an airbag or gas bag or airbag 10 according to the invention, which in the embodiments described below is designed or manufactured as an OPW airbag 10, i.e. a so-called "one piece woven" airbag 10, an airbag 10 woven from one piece.

The airbag 10 according to the invention is configured to be set from an uninflated state, such as a folded or collapsed state, to an inflated or deployed state, in which the airbag can deploy its protective effect for the occupant, for the protection of an occupant of a vehicle such as a motor vehicle or commercial vehicle in a conventional manner by means of an inflation operation. That is, the airbag 10 is deployed from the uninflated state to the inflated state in a conventional manner in response to activation of an inflation device such as a gas generator, which is activated, for example, when a vehicle collision or the like is detected.

FIG. 1a) shows a schematic representation of the airbag 10 according to the invention according to one embodiment in a lateral cross-sectional view in an inflated state, while FIG. 1b) shows a schematic representation of the airbag 10 according to the invention of FIG. 1a) in the inflated state in a cross-sectional view from above.

As shown in the schematic representation of the airbag 10 according to the invention of FIG. 1c) in the side view, the airbag or airbag 10 in the described application or in this embodiment is exemplarily designed as a steering wheel airbag and accordingly provided on a steering wheel 24 in a conventional manner not described in detail here.

FIGS. 1a) to c) only show the basic and schematic structure of the airbag 10 according to the invention, without going into more detail about its specific woven structure. The structure of the airbag 10 according to the invention is described in more detail below in connection with FIGS. 1d) to 1f).

In principle, the airbag 10 according to the invention is constructed by a plurality of fabric layers 11, 12, 13, which are explained in more detail below, wherein the airbag 10 is produced by means of the OPW process with two fabric layers in certain regions and with three fabric layers in certain regions.

In particular, the OPW airbag 10 has a first partial region ETB and a second partial region ZTB as well as an airbag chamber-forming region LKB, wherein the first partial region ETB is arranged between the airbag chamber-forming region LKB and the second partial region ZTB.

In the second partial region, the airbag 10 is formed in two layers, where the two fabric layers 11 and 13 are connected to each other in such a way that a generator mouth 18 is formed for receiving a gas generator for filling the airbag 10 or a connection area for connecting a generator, via which the airbag 10 can be filled with gas.

The airbag chamber-forming region LKB, on the other hand, is formed in three layers, with the three fabric layers 11, 12 and 13 being connected to one another in such a way that a plurality of airbag chambers 14, 16 (exemplified in FIGS. $14_1$, $14_2$, $14_3$, $14_{BK}$, . . . and $16_1$, $16_2$, . . . , $16_8$) are formed, as shown in FIGS. 1a) and 1b).

In the case shown, the airbag chambers 14, 16 in the inflated state of the airbag 10 are each designed as at least in portions tubular chambers or airbag chambers which extend parallel to a depth direction of the airbag 10 in the inflated state and are arranged in such a way that the outer shape of the airbag 10 assumes the shape of a tube or a hollow cylinder with a circular or ring-shaped cross-section. The depth direction of the airbag 10 thus essentially corresponds to the axial direction of the tube or the hollow cylinder (illustrated by the axis a in FIG. 1a)), which the airbag 10 forms in the inflated state.

As can be seen in particular in FIGS. 1a) and 1b), the plurality of airbag chambers 14, 16, which are formed as at least in portions tubular airbag chambers, are arranged offset in the circumferential direction in the inflated state, so that their arrangement forms a tubular cover or a hollow cylinder wall and thus the outer shape of the airbag 10 takes the shape of the tube or the hollow cylinder.

In FIG. 1b), it can be seen in particular that the plurality of airbag chambers 14, 16 formed as tubular chambers extend in the inflated state in the axial direction of the airbag 10 formed in the shape of the tube or hollow cylinder and are offset radially relative to one another in such a way that a first group or first plurality of inner airbag chambers 16 arranged next to one another in the circumferential direction and another, second group or second plurality of outer airbag chambers 14 arranged next to one another in the circumferential direction are formed. The tubular inner airbag chambers 16 have larger diameters than the tubular outer airbag chambers 14, which are radially adjacent further out, and therefore have a larger filling volume for the same axial length.

As can also be seen in the cross-sectional view of FIG. 1b), the fabric layers 11, 12, 13 are joined together to form the airbag 10 in the form of the tube or hollow cylinder in such a way that the fabric layers 11, 12, 13 form a tubular cover or hollow cylinder wall in the inflated state of the airbag 10, in the axial direction of which the airbag chambers 14, 16 extend, and two side end portions 22₁ and 22₂ of the fabric layers running in the axial direction are joined together, for example sewn, glued or welded. For this purpose, the fabric layers 11, 12, 13 are woven into a single layer in the side end portions, which will become apparent from the following description of the more detailed structure of the airbag 10 in connection with FIGS. 1d) to 1f), so that the side end portions 22₁ and 22₂ form at least partially single-layer seam portions 22₁, 22₂ which are joined together.

In connection with FIGS. 1d) to 1f), the specific or detailed structure of the airbag 10 is now described.

FIG. 1d) shows a schematic representation of the airbag 10 according to the invention of FIGS. 1a) and 1b) in a laid out or spread out and uninflated state, in which the seam portions 22₁, 22₂ are not yet connected or sewn together and the respective fabric layers 11, 12, 13 lie on top of one another. FIG. 1e), on the other hand, shows a schematic representation of the airbag 10 according to the invention of FIG. 1d) in cross-section, in which the fabric layers 11, 12, 13 lying on top of one another are shown slightly pulled apart for better illustration. FIG. 1f) shows a schematic representation of the airbag 10 of the invention of FIG. 1d) in a fully inflated state in cross-section from above, in which the seam portions 22₁, 22₂ are connected.

As can be seen in particular in FIG. 1d), the airbag 10 is formed as an OPW airbag with warp threads running in the warp direction K and weft threads running in the weft direction S, which are woven in certain regions into the two woven fabric layers 11 and 13, namely in the second partial region ZTB, and in certain regions into the three woven fabric layers 11, 12, 13, namely in the airbag chamber-forming region LKB. However, the warp and weft directions K and S can also be reversed.

The warp threads and weft threads are woven together in such a way that the airbag 10 forms at least one generator mouth 18 for receiving a gas generator for filling the airbag 10 or a connection region for connecting a generator in the second, two-layer partial region ZTB and the warp threads and weft threads are woven together in the three-layer region LKB forming the airbag chambers, three-layer region LKB forming the airbag chambers, the plurality of airbag chambers 14, 16 being formed, wherein the seam portions NA separating the plurality of airbag chambers 14, 16 and running in the warp direction K are indicated only schematically in the weft direction S by two or three groups of seam portions NA arranged next to one another.

In the first partial region ETB shown in FIG. 1d), which is a transition region between the second partial region ZTB and the airbag chamber-forming region LKB, i.e. is arranged between the second partial region ZTB forming the generator mouth 18 and the region LKB forming the plurality of airbag chambers 14, 16, a transition takes place from the three-layer design of the airbag 10 to a two-layer design of the airbag 10.

In particular, the airbag 10 has three fabric layers 11, 12, 13 in the airbag chamber-forming region LKB with the multiple airbag chambers 14, 16, namely a first fabric layer 11, a second fabric layer 12 and a third fabric layer 13. The second fabric layer 12 is arranged between the first fabric layer 11 and the third fabric layer 13, whereby, in relation to the hollow cylindrical or tubular airbag 10 in the inflated state, the first fabric layer 11 forms an outer fabric layer or an outer shell of the airbag 10, the second fabric layer 12 forms a middle fabric layer or inner fabric layer of the airbag

10 and the third fabric layer 13 forms an inner fabric layer or inner shell of the airbag 10.

In the first partial area ETB adjacent to the airbag chamber forming region LKB, the warp and weft yarns of the second or middle fabric layer 12 emerge from the second or middle fabric layer 12 and float completely between the first or outer fabric layer 11 and the third or inner fabric layer 13 and are bound into the first or outer fabric layer 11 or into the third or inner fabric layer 13 in the second partial area ZTB adjacent to the first partial area ETB. The fabric layers 11 and 13 of the second partial region ZTB thus have parts of the second or middle fabric layer 12. The second partial region thus connects to the first partial region ETB and finally forms the generator mouth 18 or the connection area for connecting the generator.

The second, two-layer partial region ZTB, the first partial region ETB adjacent thereto and the three-layer region LKB, which in turn adjoins the first partial region ETB and forms the airbag chambers, are bounded by a circumferential woven seam UWN in the laid-out state of the airbag 10, which is only broken up into the two woven fabric layers 11 and 13 in an inflow section of the second partial region ZTB in order to form an inflow opening in the form of the generator mouth 18 or the connection area, but in which otherwise all warp and weft threads are brought together in one fabric layer.

As can be seen above all in FIG. 1e), the airbag 10 has the three fabric layers 11, 12, 13 in the region LKB forming the airbag chambers, which forms the plurality of air chambers 14, 16. The three fabric layers 11, 12, 13 are woven together in such a way that outer airbag chambers 14 (14₁, 14₂, 14₃, 14ₐₖ,) extending in the axial direction (corresponding to the warp direction K in FIGS. 1d) and 1e)) and offset in the circumferential direction (corresponding to the firing direction S in FIGS. 1d) and 1e)) are formed between the first or outer fabric layer 11 and the second or middle fabric layer 12, and inner airbag chambers 16 (16₁, 16₂, . . . , 16₈) extending in the axial direction and offset in the circumferential direction are formed between the second or middle fabric layer 12 and the third or inner fabric layer 13. Their arrangement or this chamber structure causes the outer and inner airbag chambers 14, 16 to bend outwards in portions during their respective inflation operations to form the hollow cylinder, as can be seen in FIG. 1f).

As can be seen in particular from the cross-sections of FIGS. 1e) and 1f), the outer airbag chambers 14 (14₁, 14₂, 14₃, 14ₐₖ,) between the first or outer fabric layer 11 and the second or middle fabric layer 12 are positioned in relation to inner airbag chambers 16 (16₁, 16₂, . . . , 16₈) between the second or middle fabric layer 12 and the third or inner fabric layer 13 in such a way that one of the outer airbag chambers 14ₐₖ, namely a so-called bridge chamber covering a weave seam WN, is located or arranged on one side in relation to the second or middle fabric layer 12 between two respectively neighbouring inner airbag chambers 16, on the other side in relation to the second or middle fabric layer.

The inner airbag chambers 16 are thus spaced apart via woven seams WN, formed by the third or inner and second or middle fabric layers 13 and 12. The outer airbag chambers 14, on the other hand, are spaced apart via woven seams WU, formed by the first or outer and second or middle fabric layers 11 and 12.

Due to this arrangement, combined with the respective designs of the airbag chambers 14 and 16 with different diameters in cross-section, the curvature of the airbag 10 is achieved radially outwards, which results in the tubular or cylindrical shape of the airbag 10 when the respective seam portions 22$_1$ and 22$_2$ are connected.

These airbag chambers 14$_{BK}$ or bridge chambers push the airbag 10 or the chamber structure from the inner and outer airbag chambers 14, 16 into a curvature via the chambers 14 adjacent to them, which leads to the aforementioned tubular or hollow-cylindrical shape of the airbag 10. The bridge chambers act as a kind of hinge.

FIGS. 2 to 8 show schematic perspective representations of the airbag 10 of FIGS. 1$a$)-f) in different views.

Figure 2:
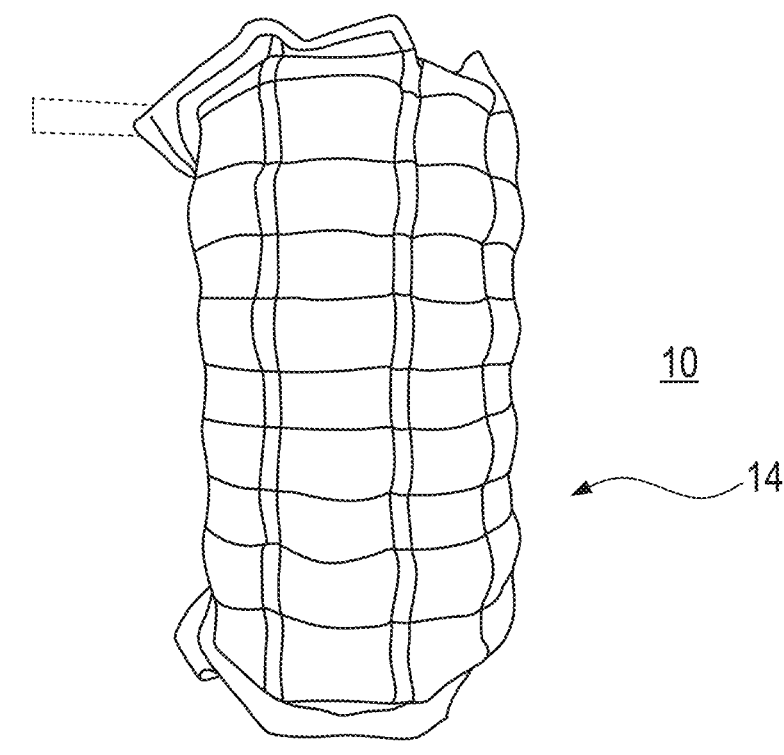
FIG. 2 a schematic perspective view of the airbag of FIGS. 1a)-f) from the side.
Figure 3:
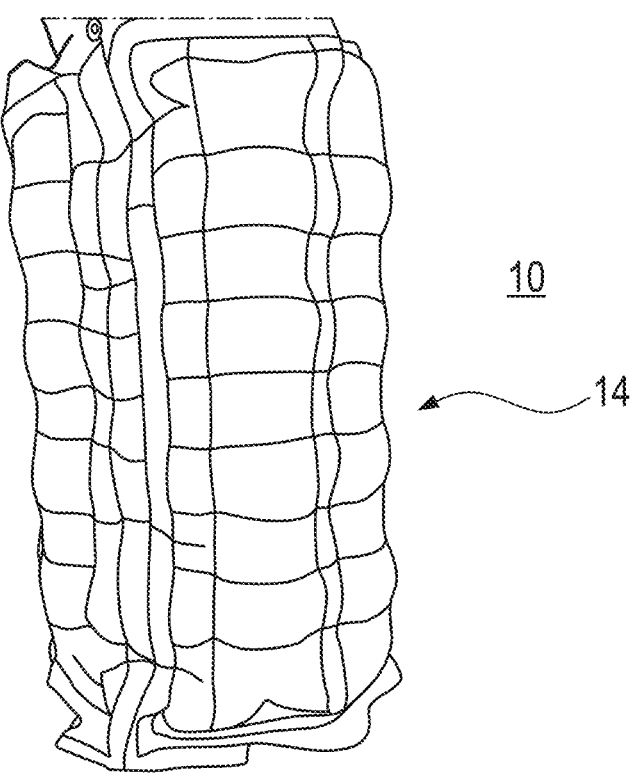
FIG. 3 a schematic perspective view of the air bag of FIGS. 1a)-f) in a further side view.

As can be seen from the side views in FIGS. 2 and 3, the airbag 10 has a cylindrical or hollow-cylindrical shape in the inflated state. This is achieved in particular by the chamber structure of the inner and outer airbag chambers 14, 16 described above and the seam portions 22$_1$, 22$_2$ sewn together.

Figure 4:
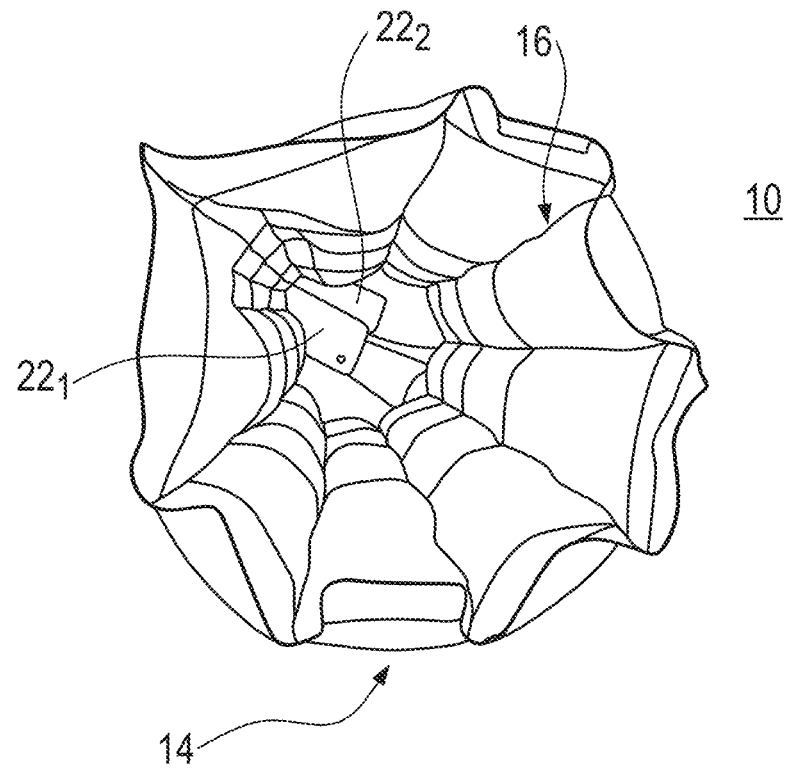
FIG. 4 a schematic perspective view of the airbag of FIGS. 1a)-f) from above.
Figure 5:
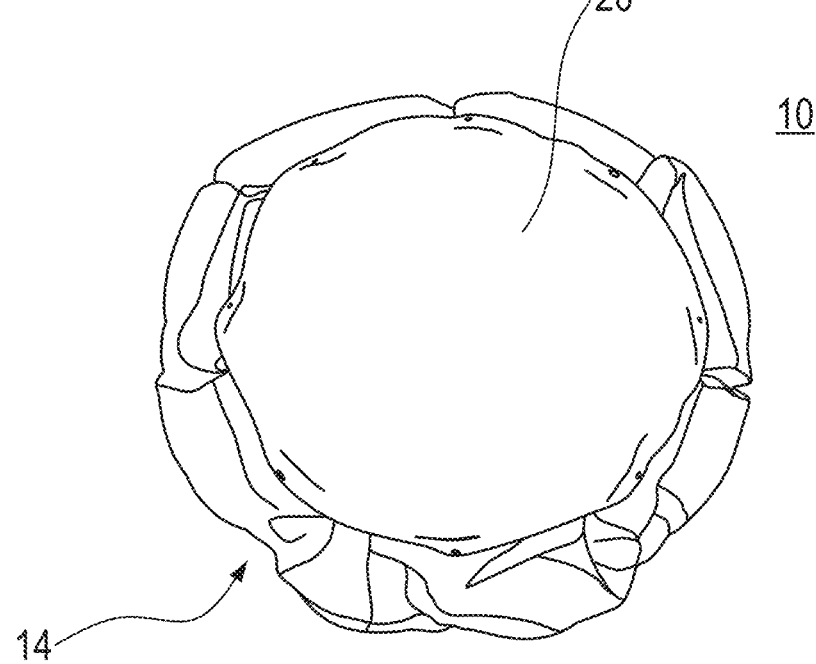
FIG. 5 a schematic perspective view of the air bag of FIG. 4 from above with a clamping element attached to the end face in the form of an essentially circular piece of flat fabric.
Figure 6:
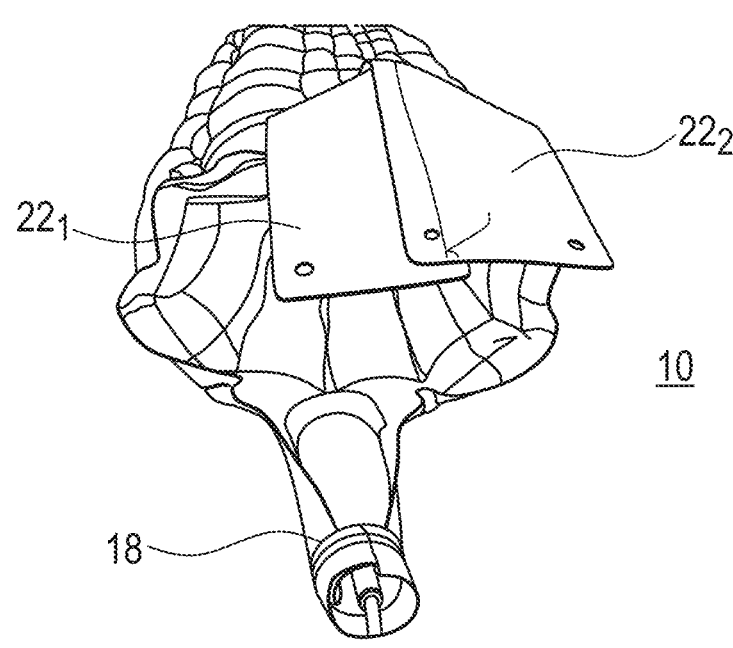
FIG. 6 a schematic perspective view of the airbag of FIGS. 1a)-f) FIG. 6 from below.
Figure 7:
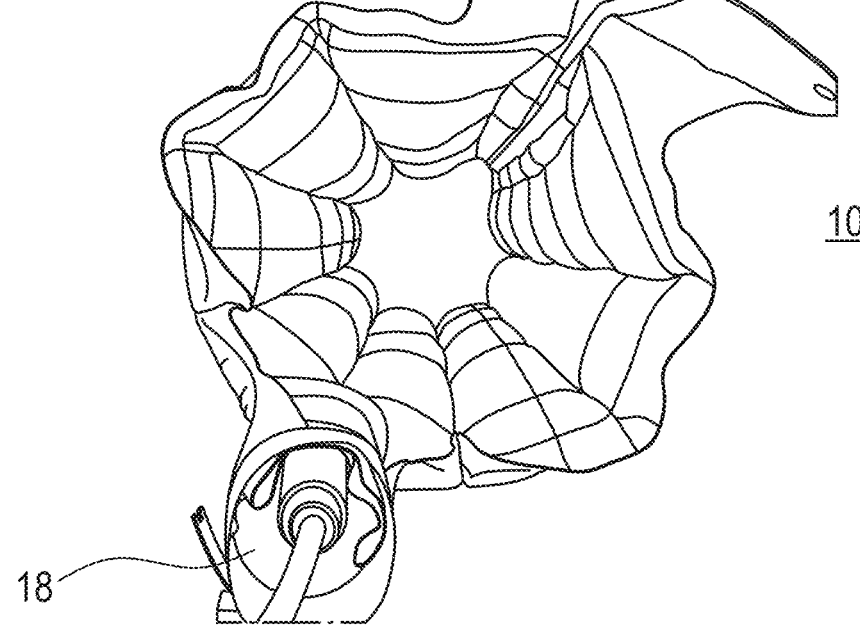
FIG. 7 a schematic perspective view of the airbag of FIGS. 1a)-f) from below.

FIGS. 4 and 5 show schematic perspective views of the airbag 10 in different views from above.

Figure 8:
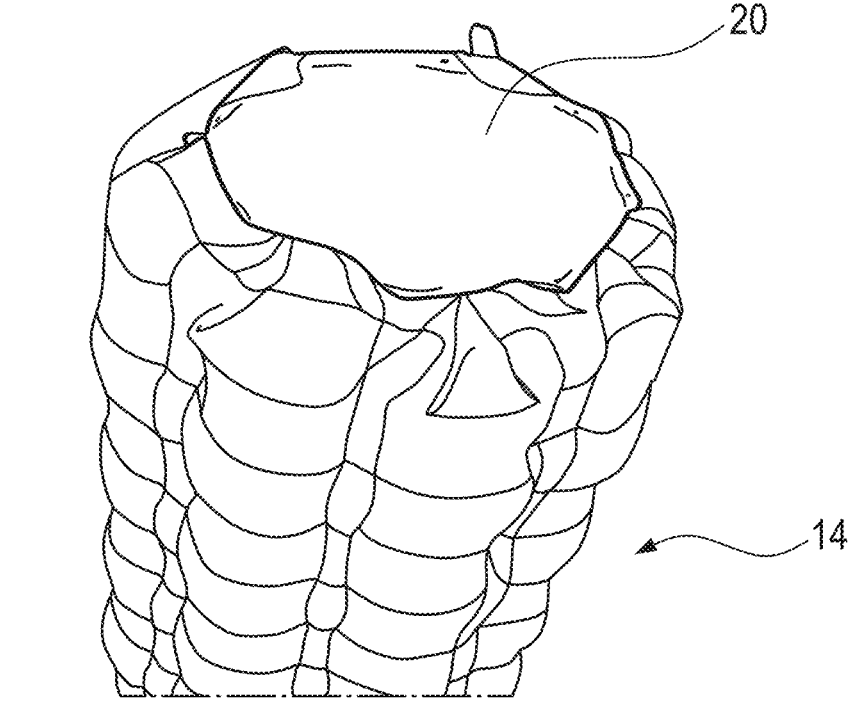
FIG. 8 a schematic perspective view of the air bag of FIGS. 1a)-f) in a further view from above with the clamping element attached to the end face.

In FIGS. 5 and 8 it can be seen in particular that an end face end portion of the airbag 10 in the form of the tube or hollow cylinder is closed with a flat clamping element 20, which spans one end face of the hollow cylinder during the inflation operation of the airbag 10. The clamping element 20 is preferably a flat and in this case circular fabric piece or flat fabric piece.

The inflation operation of the OPW airbag 10 according to the invention described above is thus as follows:

When the inflation device in the form of the gas generator is activated, gas flows from the second, two-layer partial region ZTB, which forms the generator mouth 18, first into the first partial region ETB and from there into the three-layer region LKB, which forms the airbag chambers 14 and 16. In particular, the gas flows from the first partial region ETB between the first or outer fabric layer 11 and the second or middle fabric layer 12, whereby the outer airbag chambers 14 are filled with gas.

Furthermore, the gas flows almost simultaneously between the second or middle fabric layer 12 and the third or inner fabric layer 13, so that the inner airbag chambers 16 are filled. Because the airbag chambers 14, 16 are filled with gas and the side end portions 22$_1$ and 22$_2$ of the fabric layers are connected to each other, the airbag 10 takes on the shape of a tube or wooden cylinder when inflated, stretching the flat fabric piece 20 attached to the end face when the inflated state of the airbag 10 is reached.

Figure 9:
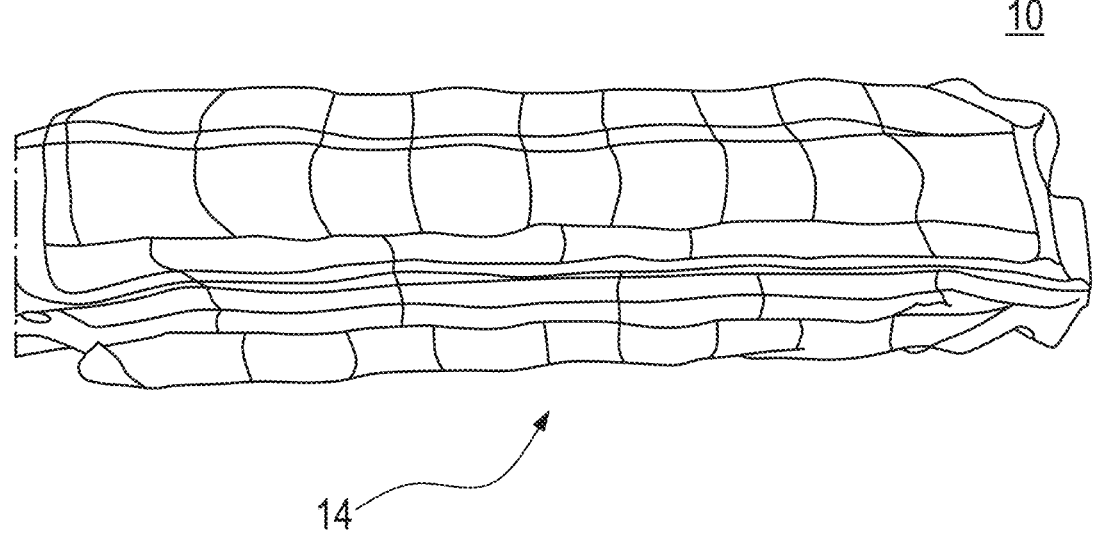
FIG. 9 a schematic representation of an airbag according to a further embodiment of the invention.

FIG. 9 shows a schematic representation of an airbag 10 according to a further embodiment of the invention. In the description of this embodiment, only the differences to the airbag 10 of the previous embodiment will be discussed.

In this embodiment, the airbag 10 is not a steering wheel airbag, but is designed as a side airbag. The structure of the airbag 10 corresponds to that of the airbag 10 of the previous embodiment, with the difference that no clamping element 20 is provided at its front ends, as this is not necessary for the application of this embodiment example.

Figure 10:
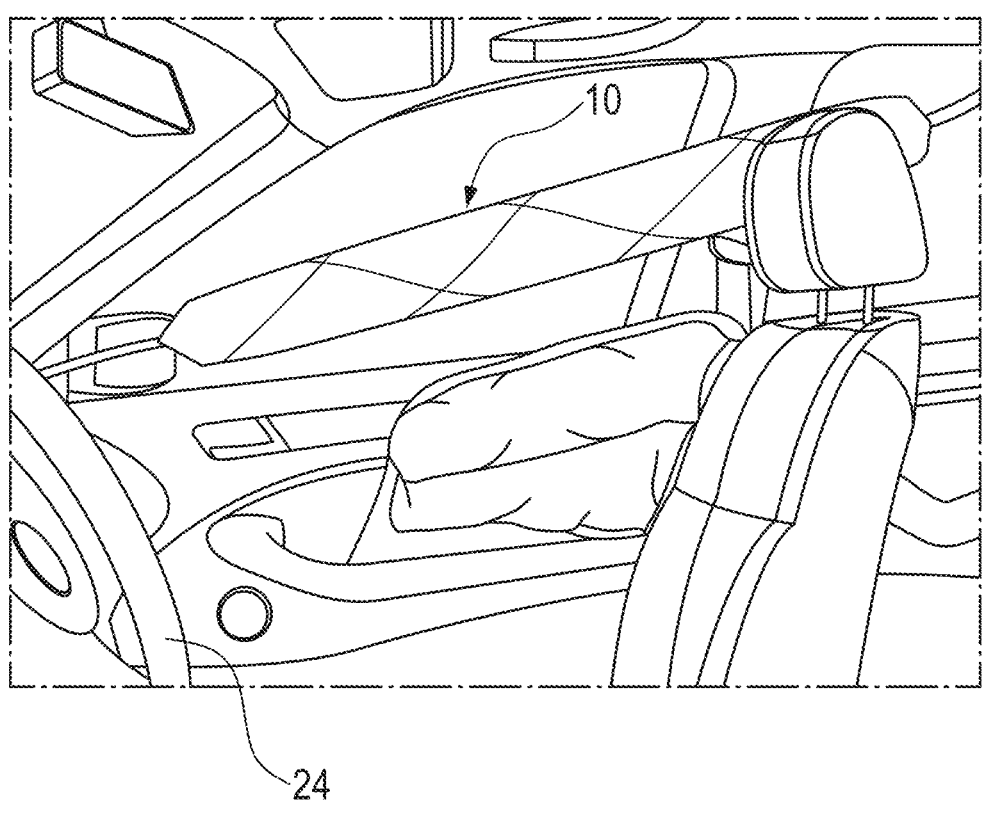
FIG. 10 a schematic representation of the airbag of FIG. 9 in a specific application.

FIG. 10 shows a schematic representation of the airbag 10 of FIG. 9 in a specific application. As can be seen therein, the airbag 10 in this case is arranged in the form of an elongated tube at the side of the window of a vehicle in the activated and inflated state.

The features of the invention which are disclosed in the above description, in the drawings and in the claims may be essential for implementing the invention both individually and in any desired combination.

LIST OF REFERENCE SIGNS

10 Airbag/Gasbag
11 outer or first fabric layer
12 middle or second fabric layer
13 inner or third fabric layer
14 outer airbag chambers
16 inner airbag chambers
18 generator mouth or connection area
20 clamping element (flat fabric piece)
22$_1$ seam portion
22$_2$ seam portion
24 steering wheel
a axis of the hollow cylindrical/tubular airbag
NA seam portion
WN woven seam
WU woven seam
UWN surrounding woven seam
ETB first partial region or transition region
ZTB second partial region
LKB airbag chamber-forming region

The invention claimed is:

1. An airbag, which is a one-piece woven airbag that is configured to be set from an uninflated state to an inflated state by an inflation operation to protect an occupant of a vehicle,
   wherein the airbag has a plurality of fabric layers including two fabric layers in certain regions and three fabric layers in other certain regions, wherein the plurality of fabric layers are one piece woven and connected to one another in such a way that a plurality of airbag chambers are formed,
   wherein the airbag chambers in the inflated state are each formed as tubular chambers which extend and/or are arranged in the inflated state in such a way that an outer shape of the airbag assumes a shape of a tube with an oval or elliptical cross-section or a hollow cylinder with a circular or ring-shaped cross-section, and
   wherein the plurality of airbag chambers formed as tubular chambers extend in the inflated state in an axial direction of the airbag formed in the shape of the tube or hollow cylinder and are radially offset with respect to one another in such a way that a group of inner airbag chambers arranged next to one another in a circumferential direction and a group of outer airbag chambers arranged next to one another in the circumferential direction are formed.

2. The airbag according to claim 1, wherein the plurality of airbag chambers formed as tubular chambers are arranged offset in the circumferential direction in the inflated state, so that an arrangement of the plurality of airbag chambers forms a tubular cover or a hollow cylinder wall.

3. The airbag according to claim 1, wherein the tubular inner airbag chambers and the tubular outer airbag chambers have different diameters and/or the tubular inner airbag chambers have larger diameters than the tubular outer airbag chambers.

4. The airbag according to claim 1, wherein the plurality of fabric layers for forming the airbag in the form of the tube or hollow cylinder are connected to one another in such a way that the plurality of fabric layers form a tubular cover or a hollow cylinder wall in the inflated state of the airbag, in the axial direction of which the airbag chambers extend, and two side end portions of the plurality of fabric layers running in the axial direction are joined together.

5. The airbag according to claim 4, wherein the plurality of fabric layers in the two side end portions are joined or woven into one layer, so that the two side end portions form single-layer seam portions which are joined together by sewing.

6. The airbag according to claim 1, wherein the three fabric layers comprise a first fabric layer, a second fabric layer, and a third fabric layer, wherein the second fabric layer is arranged between the first fabric layer and the third fabric layer, wherein the three fabric layers are woven together in such a way that outer airbag chambers extending in the axial direction and arranged offset in the circumferential direction are formed between the first fabric layer and the second fabric layer and inner airbag chambers extending in the axial direction and arranged offset in the circumferential direction are formed between the second fabric layer and the third fabric layer, wherein the outer and inner airbag chambers during their respective inflation operations cause a curvature outwards in portions to form the tube or the hollow cylinder.

7. The airbag according to claim 1, wherein the airbag is formed with warp threads and weft threads woven into the plurality of fabric layers, wherein the warp threads and weft threads are woven together in such a way that the airbag has a first partial region, a second partial region, and an airbag chamber-forming region, wherein the first partial region is arranged between the airbag chamber-forming region and the second partial region, wherein the warp threads and weft threads in the second partial region are woven together in such a way that the second partial region is formed in two layers and has at least one mouth for receiving a gas generator for filling the airbag or a connection for connecting the gas generator, wherein the warp threads and weft threads in the airbag chamber-forming region are woven together in such a way that the airbag chamber-forming region comprises the plurality of airbag chambers and is formed in three layers, and wherein the warp threads and weft threads of the second fabric layer emerge from the second fabric layer in the first partial region and float completely between the first fabric layer and the third fabric layer and are incorporated into the first fabric layer and/or into the third fabric layer in the second partial region.

8. The airbag according to claim 1, wherein an end face end portion or each of two end face end portions of the airbag configured in the form of the tube or hollow cylinder is connected or closed with a flat clamping element which spans an end face of the tube or hollow cylinder during the inflation operation of the airbag.

\* \* \* \* \*